Oct. 8, 1935.  G. KOMAREK  2,016,639

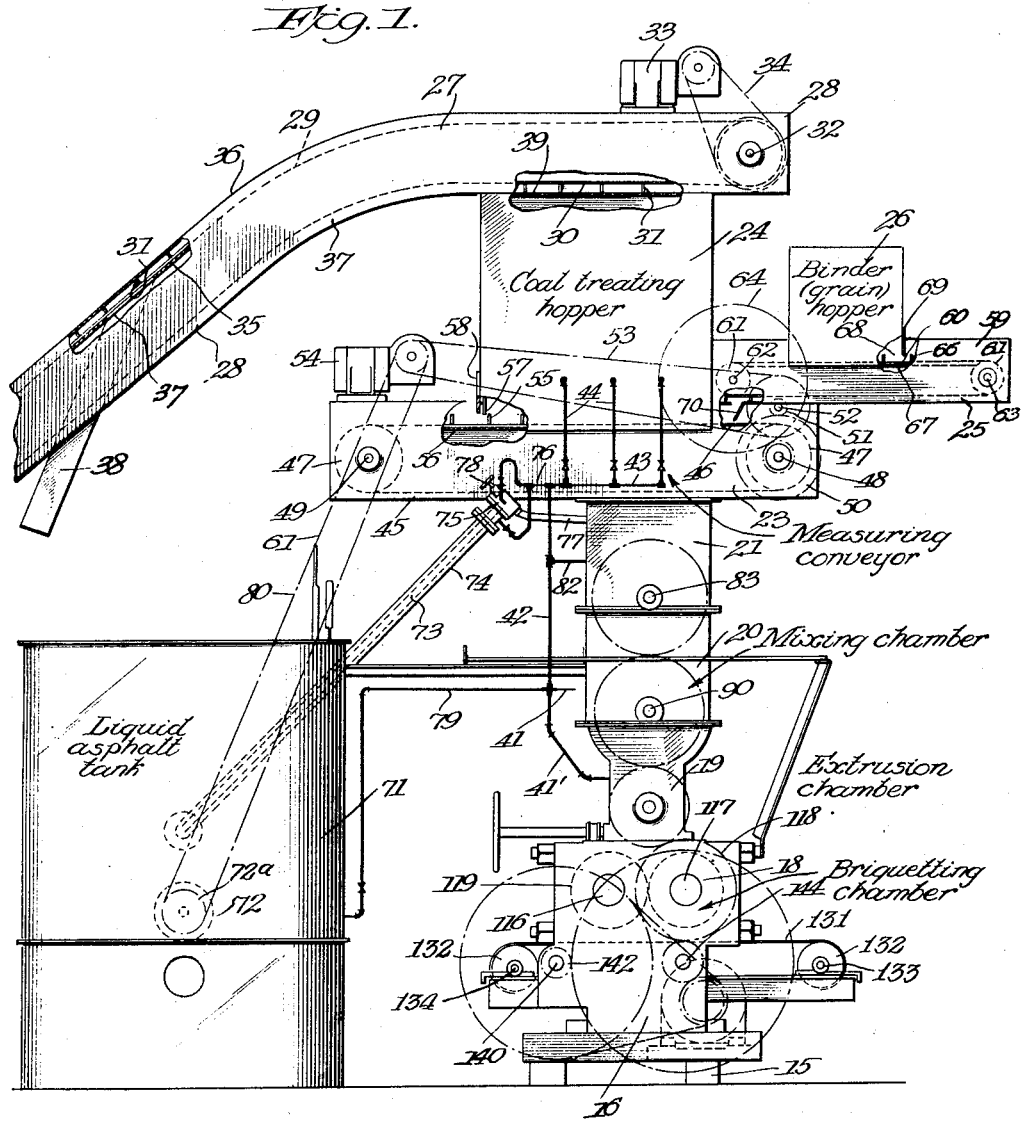

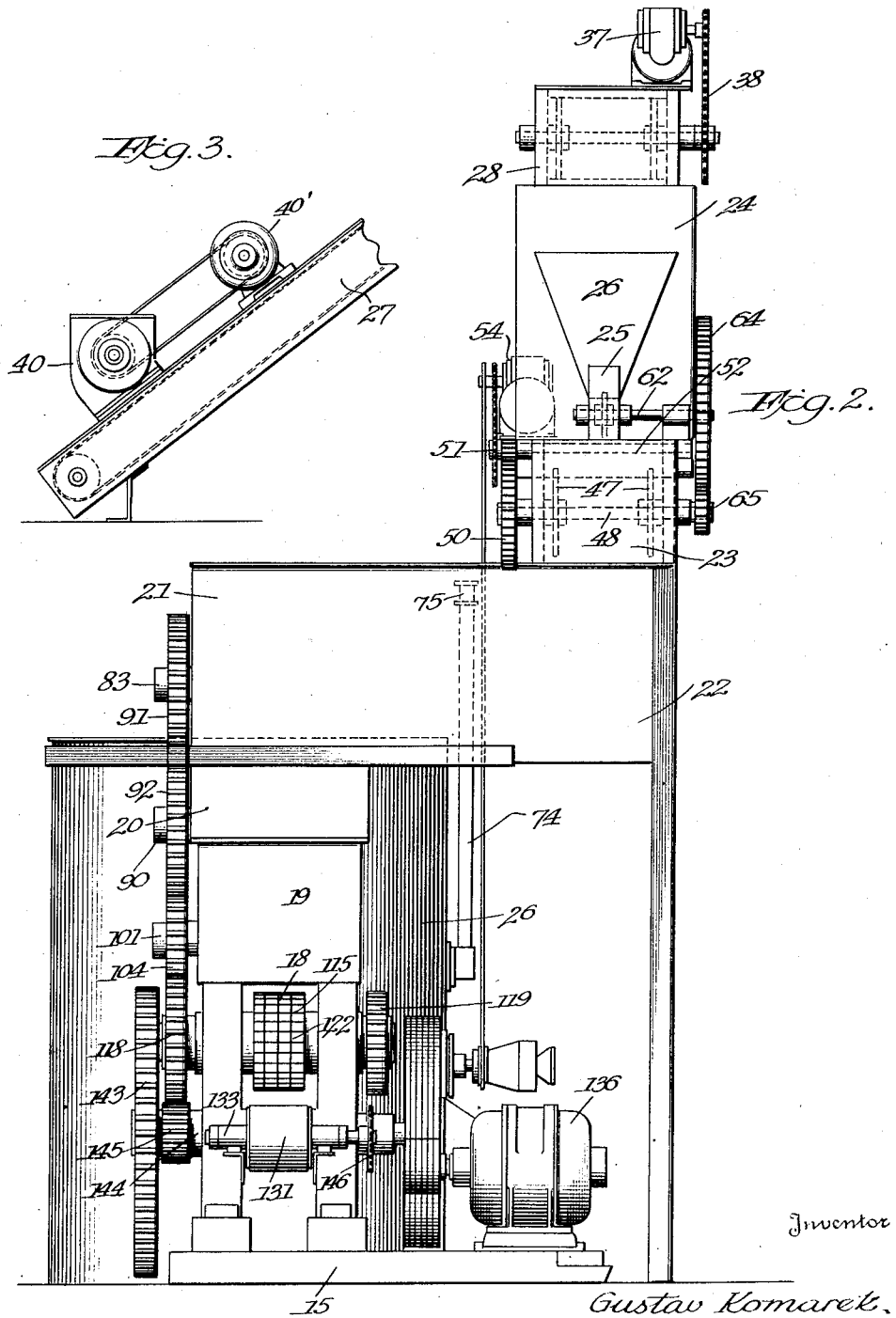

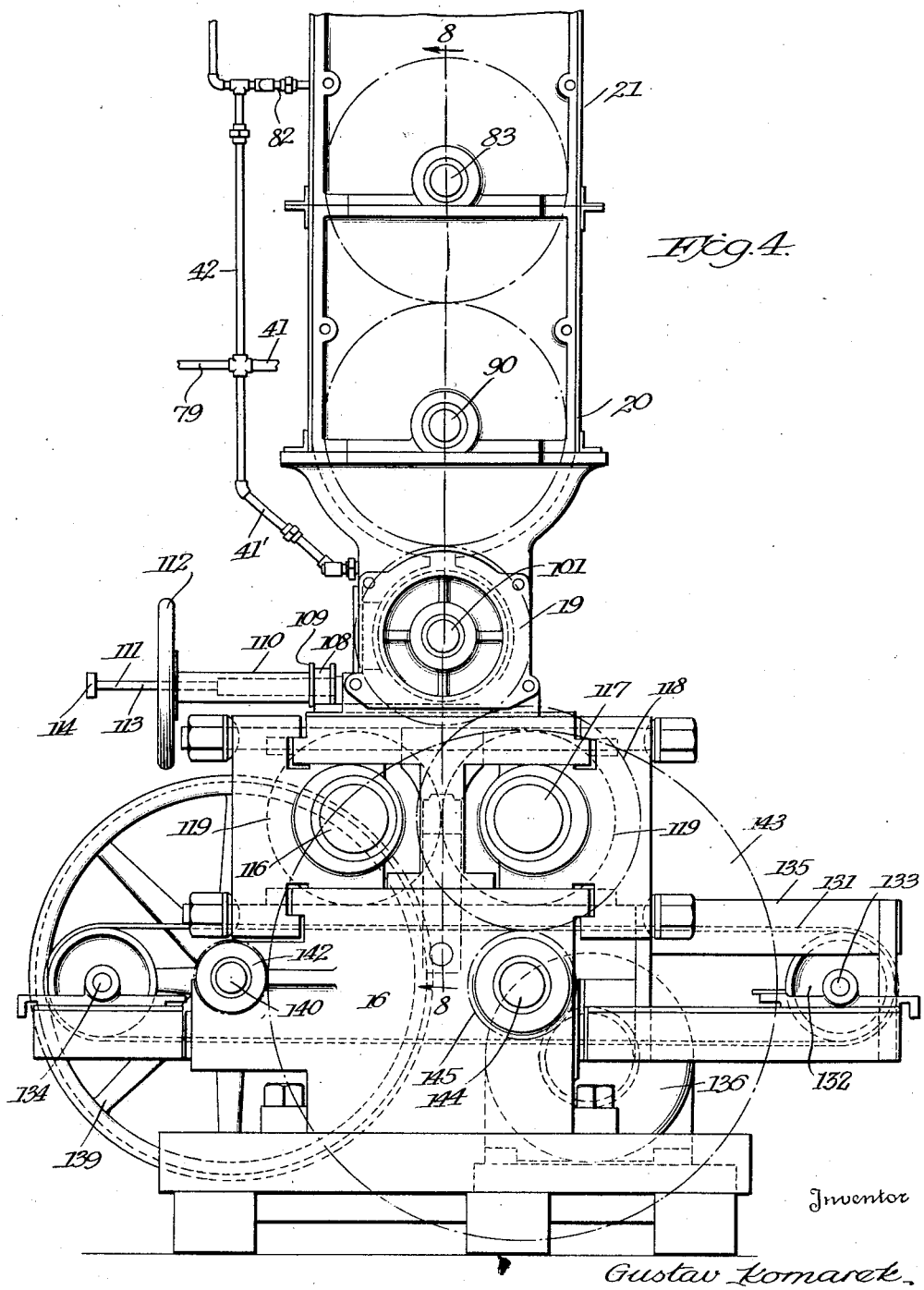

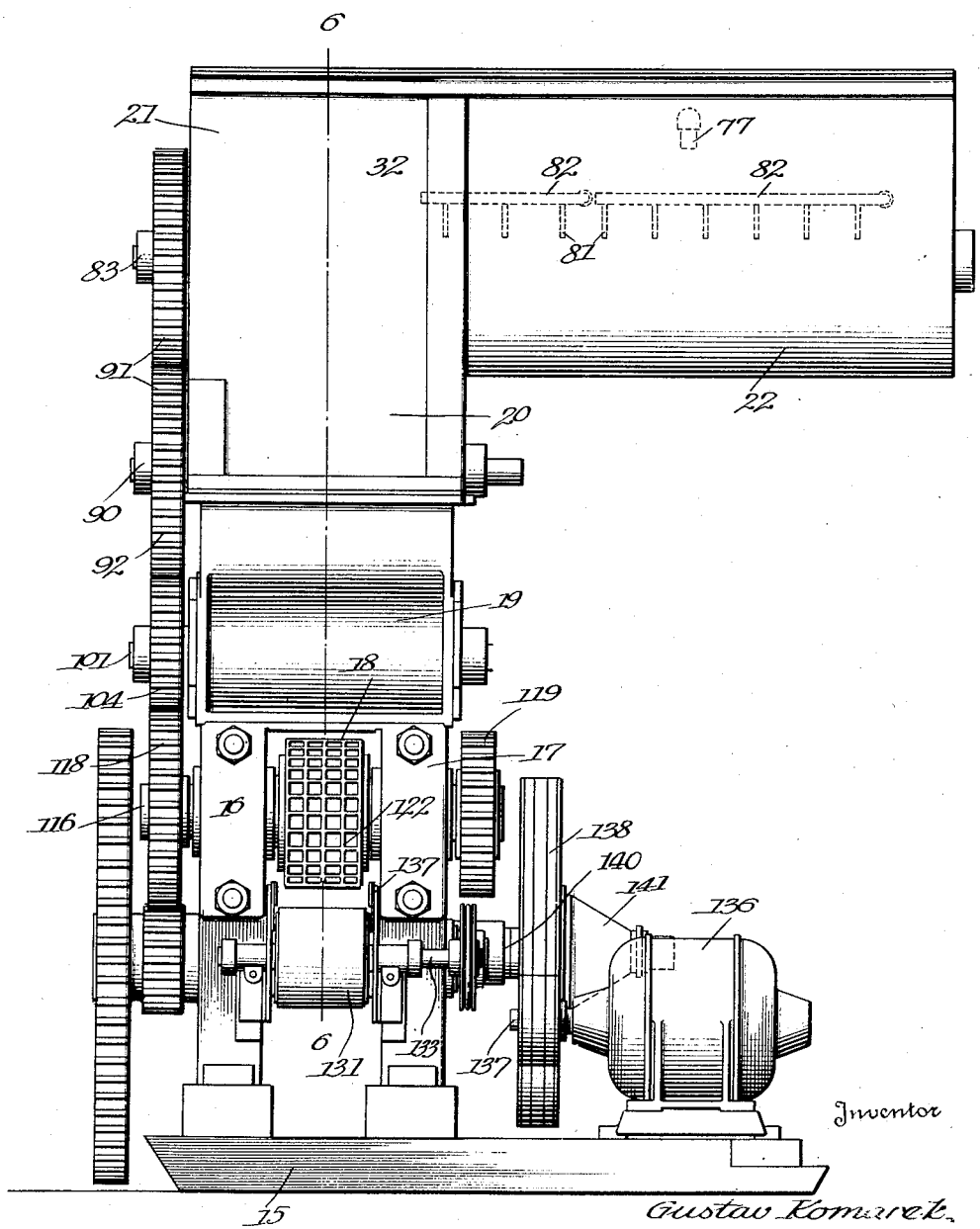

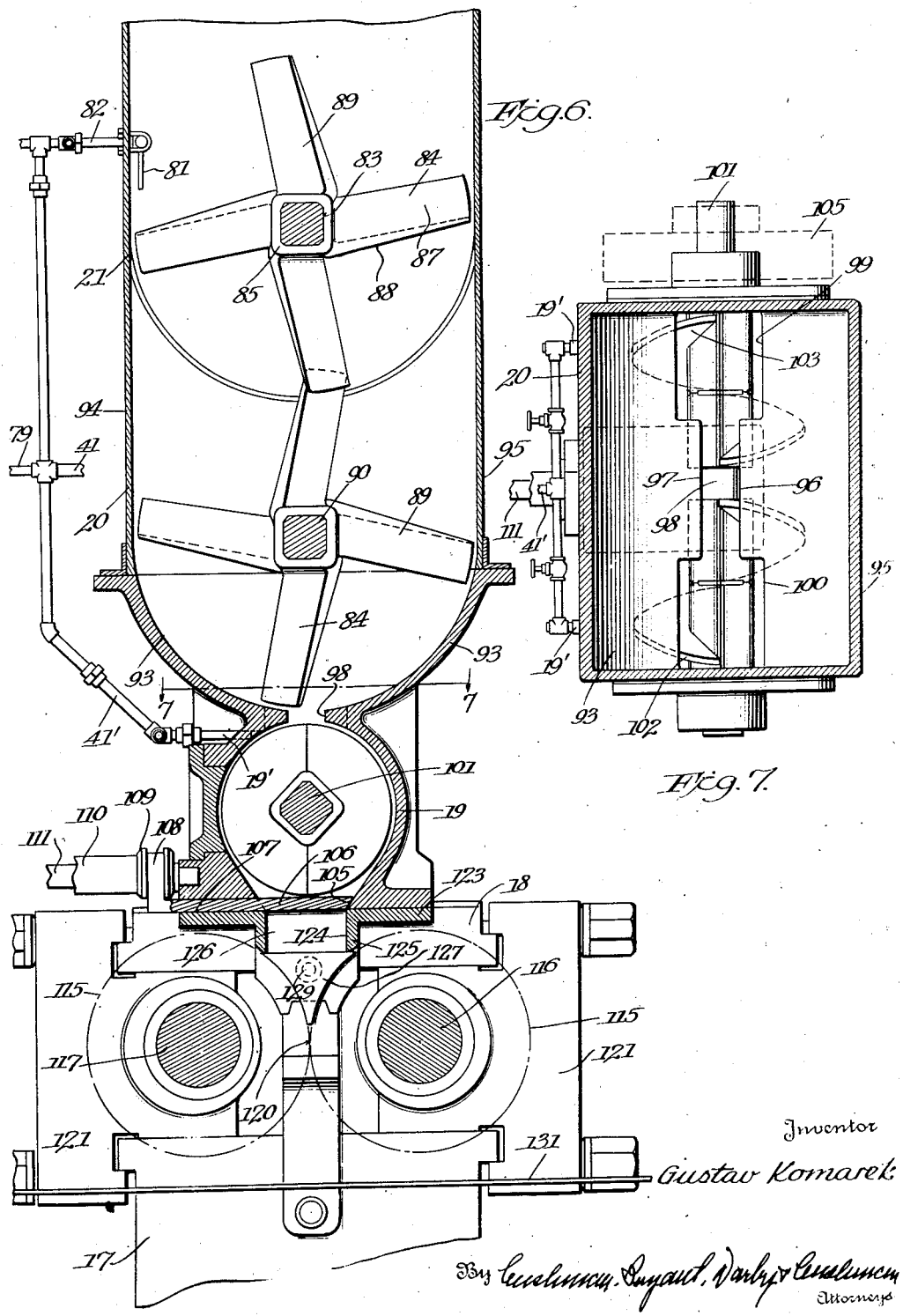

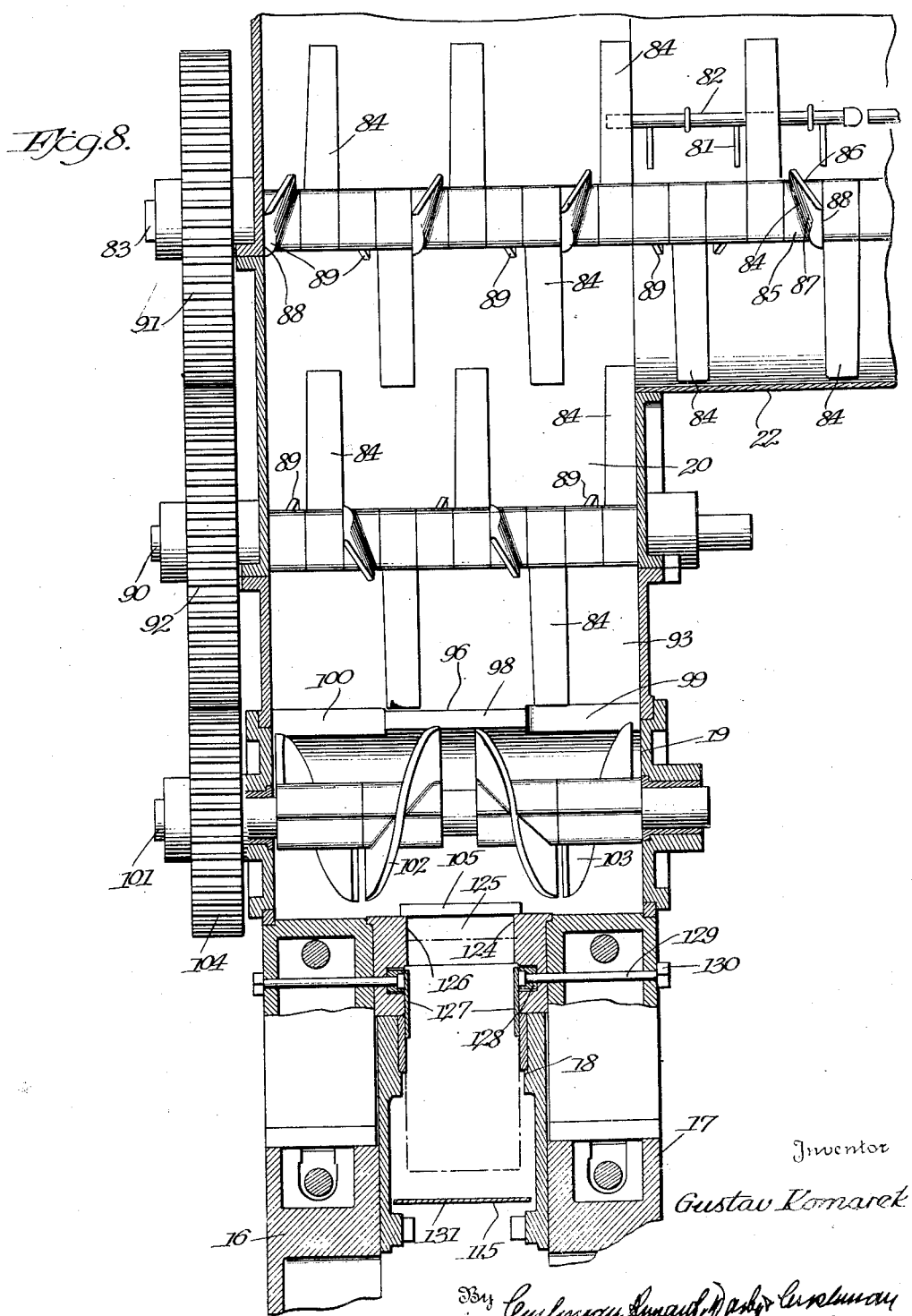

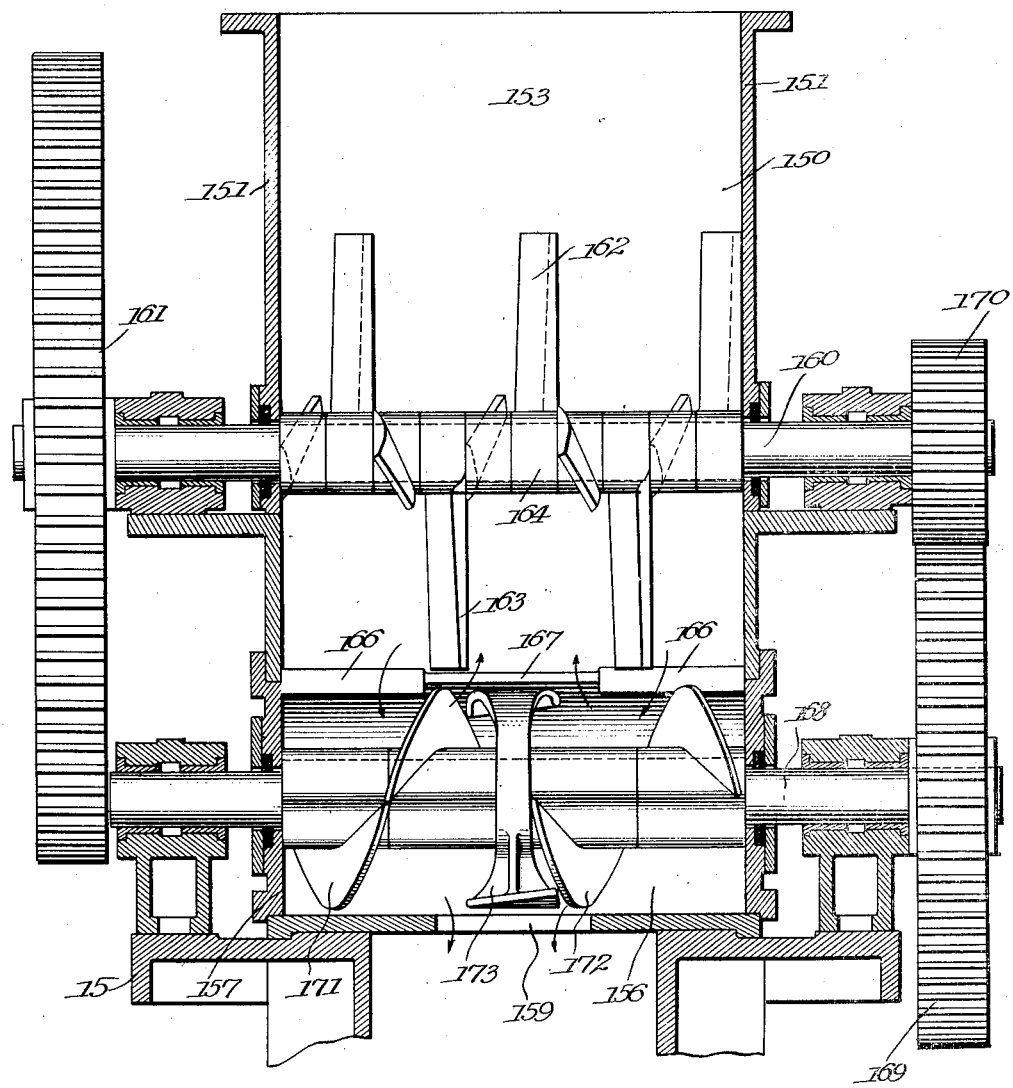

BRIQUETTE MAKING APPARATUS

Filed Dec. 24, 1932  8 Sheets-Sheet 8

Inventor
Gustav Komarek

Patented Oct. 8, 1935

2,016,639

UNITED STATES PATENT OFFICE 2,016,639

BRIQUETTE-MAKING APPARATUS

Gustav Komarek, Chicago, Ill., assignor to Komarek-Greaves & Company, Chicago, Ill., a corporation of Illinois Application December 24, 1932, Serial No. 648,802

7 Claims. (Cl. 44—13)

The present invention relates to a briquette making apparatus and a mixing device for the briquette making apparatus which is also of general application.

Briquette making plants of present day construction usually comprise five or more separate units, each of which independently performs one of the operations necessary for the manufacture of fuel briquettes from raw or untreated coal screenings and a binder. The purpose of the first unit is to heat the raw coal prior to its mixture with the binder and to either dry or moisten it depending upon its original condition. A second unit is provided to supply an adhesive binder such as asphalt, for example, which binder is highly heated to be in a fluid condition, and to preliminarily mix it with the coal treated by the first unit to prevent separation. The third unit fluxes and kneads the mixture in the presence of heat so that the mass of coal will be thoroughly permeated by the binder and a very thin film or coating of a binder will cover each particle of coal.

The fourth unit tempers or cools the mass to the temperature most practical for briquetting. This step is necessary in order that the film or binder will have the proper strength for the subsequent compressing operation. Asphalt, the binder generally used, has a relatively high tensile strength when cold and in a non-liquid state, but loses this characteristic as its temperature is increased and it becomes more liquid. The relatively high temperature to which the binder has been heated for the mixing operations of the second and third units is too high for the succeeding compressing operation wherein the mixed mass of coal particles and binder is formed into briquettes, because if the asphalt has a high temperature and is in a too liquid state when the mass is fed to the compressing mechanism, the particles comprising the briquettes will not adhere to each other during the compressing operation and the briquettes may separate into a number of parts during this latter operation. The purpose of the fourth unit, the tempering or cooling unit, is therefore to permit the temperature of the mass of coal and asphalt to be lowered subsequently to the mixing operations and before it is fed into the compressing unit. In the tempering unit, the liquid asphalt becomes thicker and has sufficient strength to hold the compressed mass more firmly together during and after compression in the fifth unit, a briquetting press.

Since each of the operations described above is conducted in a separate unit, a number of operators or attendants is necessary, at least one to supervise the operation of each unit.

The principal object of the present invention is to provide a briquette making plant which comprises a single and unitary apparatus and which is operable to perform all of the operations necessary to produce finished briquettes from raw or untreated coal screenings and to provide a method whereby briquettes may be more readily produced from raw materials.

The apparatus of my invention is so planned that it may be controlled by a single operator. The apparatus is also designed to occupy a minimum amount of space and, in its smaller embodiment, is primarily intended for use in coal storage yards, so that the coal screenings which ordinarily accumulate in such yards, and for which there is not always a ready market, may be converted into fuel briquettes.

Briefly described, the present apparatus comprises a conveyor means to supply the raw coal to the apparatus and which may include a crusher, the coal being preferably screened during the conveying operation; means to heat the raw coal and give it the desired degree of moistness; means to mix the raw coal in measured quantities with an auxiliary binding material, for example, grain, if this is practicable; means to heat an adhesive binder and supply the latter for mixture with the coal and grain, if grain is used, in the proper proportion; means to thoroughly mix the resulting mass at the proper temperature and to simultaneously permit the mass to cool to the proper temperature for the formation of briquettes therefrom and, finally, a briquetting press.

Another important object of my invention is to provide a measuring conveyor arrangement whereby the proportions of the ingredients may be accurately regulated.

Another object of the invention is to provide a plant wherein the different means for measuring and feeding the various ingredients to the mixing mechanism will be operated together so that the supply of each will be constant and there will be no waste or oversupply of any ingredient.

A further object of the invention is to provide a means for feeding the fluid adhesive binder to the mixing mechanism in such a manner that the binder will be heated to the proper temperature and will be emulsified, so that it may be more readily mixed with the coal screenings.

Another important object of my invention is the provision of a feeding and mixing mechanism which may be used in combination with a briquetting press and whereby a supply of the mixed and tempered mass suitable to the capacity of the compressing mechanism will be fed to the latter and any quantity above this capacity will be returned to the mixing mechanism.

The mixing means or mechanism of my apparatus preferably comprises two chambers, a mixing chamber and a second chamber wherein the mass is further mixed in a manner similar to a kneading action. From this second chamber, the mass is forced or extruded through an outlet to the briquetting press or to any other receiving device. The outlet from the second chamber and the communicating ports between the preliminary mixing chamber and the second chamber are so arranged that the mixing or extrusion means in the second chamber will force a portion of the mass equal to the capacity of the briquetting press to the latter, or other receiving device, but will return any surplus amount to the mixing chamber. This action is continuous and results in a very thorough mixing or kneading of the mass. The relative size of the port or aperture through which the mass is fed from the second chamber to the receiving device with respect to the size of the port between the mixing chamber and the mixing and extrusion chamber is such that the entire body of material is always under pressure and will therefore be thoroughly mixed and kneaded.

A further object of my invention is to provide a briquette making apparatus and method whereby briquettes can be formed either from coal screenings and an adhesive binder, alone, or which will also include grain or other binders of this type in the mixture.

In some localities, grain or the like can be readily procured and economically used in the manufacture of fuel briquettes. The addition of a small percentage of such a substance permits a reduction of the percentage of adhesive binder, provides a briquette which will burn with less smoke and which will also have greater strength. The present plant is so designed that it will include grain in the mixture where this is desirable.

Another object of the present invention is to provide a mixing mechanism which is particularly suited for use in a briquette forming apparatus but which is widely adaptable for other mixing operations.

A still further object of the invention is to provide a mixing and extrusion apparatus which is particularly designed for handling materials of low specific gravity and which will densify such materials and will cause them to be extruded under relatively high pressure.

In the drawings:

Figure 1 is a side elevation of the briquetting plant with portions broken away.

Figure 2 is a front elevation of the plant.

Figure 3 is a side elevation of the lower end of a conveyor including a crusher which may be used with my apparatus.

Figure 4 is a side elevation of the briquetting apparatus used with the plant, with the upper portion broken away.

Figure 5 is a front elevation of the briquetting apparatus shown in Figure 4.

Figure 6 is a central vertical cross sectional view of the briquetting apparatus taken on the line 6—6 of Figure 5, with the lower portion omitted.

Figure 7 is a horizontal sectional view taken on line 7—7 of Figure 6.

Figure 8 is a vertical sectional view taken on the line 8—8 of Figure 4.

Figure 9 is a central vertical sectional view showing a modified form of mixing device.

Figure 10:
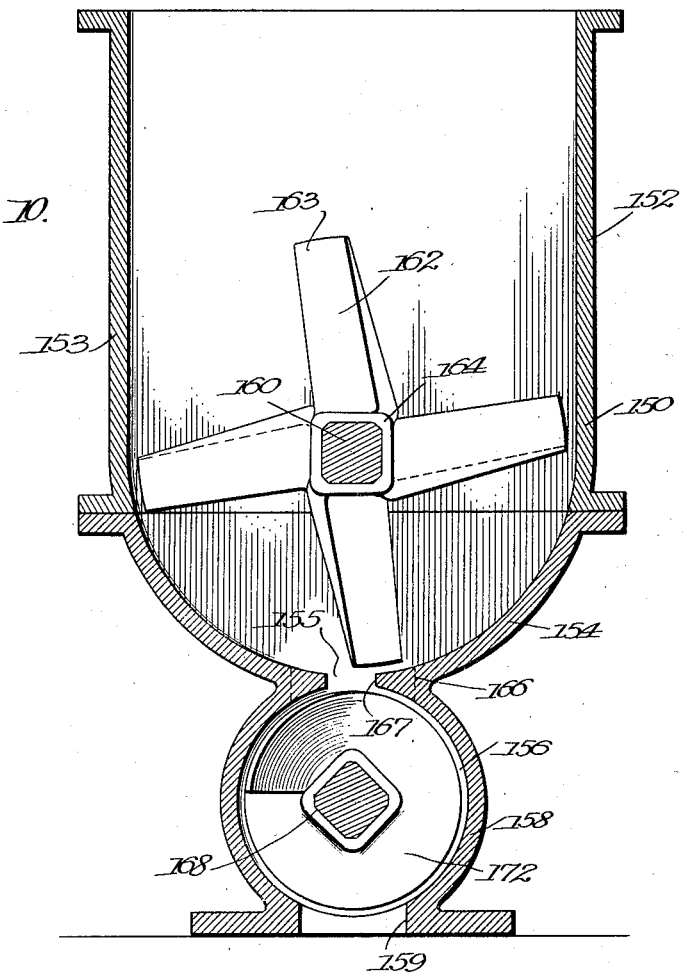
Figure 10 is a vertical sectional view taken of the apparatus of Figure 9.

Referring to the structure shown in Figures 1 to 8, inclusive, and more particularly to Figures 1 and 3, a base 15 is provided including upright supporting members 16 and 17 upon which the briquetting press 18 is mounted. A feeding or extrusion chamber 19 is supported above the briquetting press 18 on the upright members 16 and 17 and the walls of the chamber 19 extend upwardly to form a mixing chamber 20. The walls of the chamber 20 are also extended upwardly to form an upper mixing chamber 21 and the upper mixing chamber 21 is extended laterally at one end as indicated by the numeral 22 in Figure 2.

The treating hoppers and measuring chambers of the auxiliary apparatus which may be used with the mixing and extrusion chambers and the briquetting press are preferably supported upon the laterally extended portion 22 of the upper mixing chamber 21. A measuring chamber 23 rests directly on the lateral extension 22 and, in turn, supports a coal treating hopper 24. A grain binder measuring chamber 25 extends from the upper portion of one end of the measuring chamber 23 and supports a binder hopper 26. A conveyor 27 for feeding the raw coal to the coal treating hopper 24 has its upper end 28 supported upon the latter hopper.

The conveyor 27 preferably comprises a closed casing 28 in which an endless drag conveyor element 29 operates. The conveyor element 29 is formed of laterally spaced chains 30 with drag members 31 extending between them. A driving shaft 32 for the conveyor is provided at the upper end of the casing 28 and is operated by a motor 33 through suitable reduction gearing and a driving chain or belt 34. The lower end of the conveyor element moves about an idler shaft in the extreme lower end of the casing 28, which portion of the casing is not shown in Figure 1. The upper portion of the upper run of the conveyor 29 moves upon a supporting plate 35 spaced from the upper wall 36 of the casing 28, plate 35 terminating above the upper end of a chute 38 which extends across the interior of the casing 28. By this arrangement, the raw coal is moved upwardly through the casing 28 by the drag members 31 on the lower run of the conveyor element 29 and is moved across a screen 39 provided at the upper end of the coal treating hopper 24. The screen 39 will permit particles of coal of the proper size to fall into the hopper 24, but larger particles will be moved across the screen and will be carried upwardly and down along the upper run supporting plate 35 to the chute 38 which will deliver them to the exterior of the apparatus.

Figure 2 shows the lower end of a conveyor similar to 27 but provided with a coal crusher 40 into which the raw coal may be fed, the crushed coal then being fed upwardly through the conveyor 27. The crusher may be driven by a motor 40', as shown.

The screenings or raw coal will preferably be delivered to the coal treating hopper 24 at such a rate that this hopper will be kept substantially full.

A boiler, not shown, is included in the plant and delivers steam to the apparatus through piping indicated at 41. Steam from the pipe line 41 is passed through the line 42 to a lateral extension 43 from which the steam is distributed through branches or headers 44 which extend into the lower portion of the coal treating hopper 24. The portions of the headers 44 within the hopper 24 are provided with apertures or jets through which the steam is distributed among the mass in the hopper. The mass of coal is thus heated to a temperature at which it may be properly amalgamated with a liquid binder in a manner hereinafter described. If the raw coal as received in the coal treating hopper 24 is wet or even moist, superheated steam is injected into the coal treating hopper, while if the coal is dry and dusty, saturated steam is injected into the hopper. In some cases, a small amount of hot water is necessary to obtain the condition most favorable for the amalgamation of the coal and liquid binder.

The measuring conveyor 23 beneath the coal treating hopper 24 is provided with a casing 45 which is of substantially the same width as the coal treating hopper and serves to close the lower end of the latter. Conveyor 23 comprises an endless belt element 46 moving upon drums or discs indicated by the numeral 47 carried by shafts 48 and 49 journaled at the respective ends of the casing 45. The shaft 48 is provided with a gear 50 at one end thereof exteriorly of the casing 45, which gear meshes with a pinion 51 fixed to a counter-shaft 52 journaled in the casing 45 above the shaft 48. Counter-shaft 52 is driven by means of a chain 53 from a small motor 54 mounted upon the casing 45.

The belt 46 is provided with spaced upstanding cross bars 55 and the upper run of the belt moves upon a plate 56 which, in effect, forms the lower wall of the coal treating hopper 24. As is shown in Figure 1, the upper run of the belt 46 moves into the lower end of the coal treating hopper 24 from the right and moves across the plate 56, leaving the treating hopper 24 through an aperture 57. A gate or valve 58 is provided at the aperture 57 to regulate the size of the aperture to accurately measure the amount of coal screenings which are removed from the hopper by the belt 46.

The binder hopper 26 for grain or the like will only be used in localities where the use of such material as a portion of the binder is practical. The addition of a small percentage of ground grain or any such starchy material ground to suitable fineness produces a superior briquette, since it permits a reduction of the percentage of asphalt binder, thereby rendering the briquettes more smokeless and giving them greater strength.

Material is fed from the grain binder hopper 26 by the conveyor generally indicated by the numeral 25 which includes a casing 59. Conveyor 25 comprises an endless belt 60 which moves upon rollers 61 fixed to shafts 62 and 63 journaled in the walls of the casing 59 at each end thereof. The shaft 62 has a large gear 64 fixed thereto which meshes with a small gear 65 carried by the shaft 48 of the conveyor 23. The belt 60 is of considerably less width than the belt 46 of the conveyor 24 and is provided with spaced upstanding members 66. The upper run of the belt 60 moves upon a plate 67 fixed in the casing 59 and which forms the bottom wall of the hopper 26. Belt 60 moves into the hopper 26 from the left (Figure 1) and passes across the plate 67, leaving the hopper through an aperture 68. A gate or valve 69 is provided at the aperture 68 to regulate the size of the latter. Grain or similar binding material will be removed from hopper 26 by the belt 60 through the aperture 68 and will be carried around and along the bottom wall of the casing 59 to an outlet 70 which opens into the casing 45 above the belt 46 therein at a point in advance of the point at which belt 46 moves into the coal treating hopper 24.

By the above arrangement, the belt 60 moving through the binder hopper 26 will remove a relatively small amount of grain or the like therefrom and will deposit it upon the belt 46. Belt 46 will carry the grain into the lower portion of the coal treating hopper 24 and will remove a much larger quantity of coal screenings therefrom which will lie upon the belt with the grain. The belt 46 will convey the mixture through the casing 45 to feed it to the upper end of the upper mixing chamber 21.

An adhesive binder such as asphalt or the like is supplied to the extended portion 22 of the upper mixing chamber 21 from a tank 71 by means of a pump 72, preferably within the tank 71, which forces the asphalt upwardly through a pipe 73 enclosed in a steam jacket 74. The pipe 73 delivers the asphalt to an emulsifier 75 which mixes the asphalt with steam supplied through a line 76 branching from the steam line 42, the mixture then being blown by the pressure of the steam into the upper portion of the upper mixing chamber 21 through a nozzle 77. The emulsifier 75 includes a regulating valve 78 whereby the quantity of asphalt delivered to the pipe 77 may be closely regulated.

The asphalt or liquid binder heating tank 71 is preferably heated externally by direct heating means (not shown) to initially bring it to the proper temperature for mixing to form briquettes. Steam coils (not shown) within the tank and immersed in the binder serve primarily to hold the binder at the proper temperature. The steam is supplied through a line 79 extending from the steam feed pipe 41. The asphalt pump 72 is driven from the motor 54 by means of a chain or belt 80. A safety or overload clutch 72a may be included in the shaft of the pump 72 and a relief valve, not shown, opening into the tank may be provided on the pump to accommodate any surplus above the capacity of the valve 78. A liquid level guage and a thermometer (not shown) may be included upon the tank 71 to indicate the quantity of binder in the tank and its temperature.

Steam is also delivered to the extended portion 22 of the upper mixing chamber 21 through nozzles 81 extending downwardly from horizontal headers 82, which are connected on the exterior of the chamber 21 to the steam line 42.

Since the measuring conveyors 23 and 25 which feed the coal screenings and the grain to the mixing chamber 21 are both driven from the motor 54, the amounts of the respective materials fed by these conveyors will be constant during the operation of the plant. It will be understood that the respective amounts of each of the ingredients may be varied by adjustment of the gates or valves 58 and 69 provided upon the hoppers 24 and 26, respectively. Also, the operation of the asphalt pump 72 from the motor 54 which drives the measuring conveyors 23 and 25 insures that the feeding of all of the ingredients used in the briquettes will begin and terminate at the same moment, making for efficiency in the operation of the plant.

The upper mixing chamber 21, including the laterally extended portion 22, has a horizontal shaft 83 extending longitudinally thereof and journaled for rotation in its end walls. The length of the shaft within the extended portion 22 is provided with a series of paddles 84, adjacent paddles preferably being circumferentially spaced by an angle of 90°, as shown in Figure 6. Each of the paddles 84 includes a hub portion 85 (Fig. 6) provided with a square bore to fit the shaft 83 and a generally flat and straight blade 86. The blade of each paddle is inclined or turned on its longitudinal axis to provide a pushing surface 87. The pushing surface 87 of each blade is preferably rounded or beveled from its leading edge 88 while the rear surface of the blade is flat to the leading edge so that the leading edge has somewhat of a cutting action. The pushing and the rear surfaces of each blade 86 converge slightly from the hub to the outer end of the blade. As is illustrated in Figure 8, the pushing surfaces 87 of the paddles 84 within the extended portion 22 are toward the left so that when the shaft 83 is properly rotated, the mass of material in the extended portion 22 will be moved to the left (Figures 5 and 8) or out of the extended portion 22. During this movement, the mass is sprayed with the fluent binder from the nozzle 77 and is also heated by steam from the nozzles 81.

The length of the shaft 83 within the main portion of the upper mixing chamber 21, that is, the portion directly above the lower mixing chamber 20, is provided with a plurality of mixing paddles 84 and 89 exactly similar to those within the extended portion 22 except that the pushing surfaces 87 of the paddles 89 face toward the right as viewed in Figures 5 and 8 and will therefore move material to the right when shaft 83 is properly rotated. The paddles are arranged upon the shaft in a circumferential series, adjacent paddles preferably being radially spaced at an angle of 90°, and right-hand paddles 89 alternating with left-hand paddles 84. It will be noted that the paddle at the extreme left-hand end of the extended portion 22 of chamber 21 is a right-hand paddle 89 and that the paddle 89 at the extreme left-hand end of the shaft 83 is also a right-hand paddle, the leading edge 88 of the last named paddle scraping the inner surface of the left end wall of the chamber 21 to prevent any portion of the mass from adhering thereto.

A horizontal shaft 90 is journaled in the end walls of the lower mixing chamber 20 and extends parallel with and directly beneath the shaft 83. The shaft 90 is also provided with alternately arranged paddles 84 and 89 which are mounted on the shaft 90 in the manner described in connection with the corresponding paddles on the upper shaft 83. Shafts 83 and 90 are provided with large gears or pinions 91 and 92, respectively, on their outer ends as shown in Figure 8 which gears intermesh so that the two shafts will rotate in timed relation. The corresponding paddles on the two shafts are so arranged and the meshing of the gears is such that although the circles described by the ends of the paddles on the respective shafts will overlap, nevertheless, the corresponding paddles on the respective shafts will never come into contact with each other. It will be noted that the paddle at the extreme left-hand end of the shaft 90 is a right-hand paddle 89, while the paddle at the extreme right-hand end of the same shaft is a left-hand paddle 84, this arrangement of these two paddles serving to remove material from the inner surfaces of the end walls of the chamber.

The rotation of the shafts 83 and 90 with the paddles fixed thereto as described, will cause the mass of coal, grain and binder, or coal and liquid binder, alone, to be thoroughly intermixed so that every particle of coal will be coated with a thin film of the liquid binder and the grain, if grain is used, will be converted to starch and to form part of the binder. The steam supplied through the nozzles 81 serves to heat the mixture to insure that the asphalt or other liquid binder is in a sufficiently liquid state to properly flow and coat the coal particles and to also bring the coal to the proper temperature for mixing.

The arrangement of the paddles 84 and 89, whereby adjacent paddles face in opposite directions, causes the mass to be thoroughly mixed, since a right-hand paddle 89 will act upon a portion of the mass to move it to the right and, to some extent, in a circular direction. Movement of this portion of the mass to the right will bring it into contact with a left-hand paddle 84 which will tend to move the material back into the path of the right-hand paddle and also in a circular direction. A complete mixing of the ingredients will thereby result.

The mixture is moved downwardly through the lower mixing chamber 20 by the action of the paddles 84 and 89 and due to its own weight. The lower portions 93 of the front and rear walls 94 and 95 of the mixing chamber 20 are curved inwardly as shown in Figure 6 and an aperture 96 is provided at the lowermost portion of the chamber 20 to place the latter chamber in communication with the feeding and extrusion chamber 19. As shown in Figure 7, the lower walls of the chamber 20 are extended inwardly as shown at 97 at the central portion of the aperture 96 so that a relatively narrow port 98 is provided at the central portion of the lower end of the chamber 20 while relatively wide ports 99 and 100 are provided at either side of the relatively narrow port 98.

The feeding or extrusion chamber 19 is substantially circular in cross section as shown in Figure 6 and has a shaft 101 journaled in its end walls to which two spirally bladed feeding and extrusion members 102 and 103 are keyed or otherwise secured. As is best shown in Figures 7 and 8, the spiral members 102 and 103 may be formed in sections and are respectively reversely spiraled, the member 102 being spiraled to force material to the right or center of the chamber 19 while the member 103 is spiraled to force material to the left or also to the center of the chamber. The blades of the spiraled members 102 and 103 are of sufficient diameter to be closely adjacent the inner walls of the chamber 19. The shaft 101 to which the spiraled members are fixed is provided at its outer end with a gear 104 which meshes with the gear 92, shaft 101 being directly below and parallel with the shaft 90.

The lower portion of the feeding chamber 19 is provided with an outlet port or aperture 105 opposite the reduced aperture 98. The size of the port 105 may be adjusted by means of a horizontal valve or gate 106 (shown entirely closed in Fig. 6) which moves in a slideway 107 extending through the rear wall of the feeding chamber 19. The exterior end of the valve 106 is provided with upstanding spaced lugs 108 which fit either side of and between spaced flanges 109 upon the inner end of a sleeve 110 which has threaded engagement with a screw-threaded rod 111 which is fixed at its inner end to the outer wall at the feeding chamber 19. As is best shown in Figure 4, a hand wheel 112 is fixed to the outer end of the sleeve 110 so that the latter may be rotated to adjust the position of the gate 106. The outer portion 113 of the threaded rod 111 is reduced in diameter and unthreaded and a stop 114 is provided at its extreme outer end. The stop 114 serves to prevent the sleeve 110 from being moved too far outwardly upon the rod 113.

Steam nozzles 19' project into the feeding chamber 19 and are connected to the steam supply pipe 41 by a lead 41'. If necessary or desirable, the material in the feed chamber 19 may thereby be given additional heat treatment in case the mass has become too cool to permit it to hold together during briquetting or subsequently thereto.

Briquetting rolls 115 are fixed to briquetting press roll shafts 116 and 117. A gear 118 at the left-hand end (Figures 2 and 5) of the press-roll shaft 116 meshes with the gear 104 on the feeding shaft 101 and the press roll shafts 116 and 117 have intermeshing gears 119 at their opposite or right-hand ends and hence, the shafts 116, 117, 101, 90 and 83 will all be rotated together. The means for rotating the shafts will be subsequently described. The briquetting rolls 115 are adapted to contact at the point 120, in the usual manner, this point being substantially on the vertical center line of the feeding chamber 19 and mixing chamber 20 and centrally positioned with respect to the aperture or port 105 at the lower side of the feeding chamber 19. The shafts 116 and 117 are mounted in journals 121 adjustable in the side supporting walls or members 16 and 17 of the briquetting apparatus, permitting the rolls to be adjusted to proper contact. The rolls 115 have pockets or depressions 122 of conventional formation in their peripheral surfaces, the pockets of the respective rolls being aligned at the point of contact 120 to act together to compress the material received from the aperture 105 into briquettes. In order to completely close the space between the lower side of the feeding chamber 19 and the upper surfaces of the press rolls 115 so that the material extruded from the feeding chamber will be under proper pressure, I provide a plate 123 carried at the lower side of the feeding chamber, which plate has a port or aperture 124 therein aligned with the aperture 105 of the feeding chamber. Downwardly extending flanges 125 are provided at the front and rear sides of the aperture 124, which flanges have beveled lower edges, as shown in Fig. 6, in close proximity to the upper peripheries of the press rolls 115. Longer downwardly extending flanges 126 integral with flanges 125 are provided at each side of the aperture or port 124, these flanges being sufficiently long to extend down along the sides of the press rolls 115, as shown in Figures 6 and 8. The flanges 126 have a slight depression on their inner surfaces opposite the press rolls and cheek plates 127 are seated in these depressions on the respective flanges, the cheek plates having bosses 128 on their rear surfaces which extend into sockets in the flanges 126 and in which headed bolts 129 are rotatably fitted. The bolts 129 extend throughout the side walls 16 and 17 of the briquetting press and their ends are threaded to receive nuts 130 so that the cheek plates may be clamped in proper position. As is best shown in Fig. 6, the check plates 127 are substantially triangular in shape and their lower side edges are arcuate to conform to the peripheries of the press rolls. By the arrangement described above, the space above the press rolls and at either side thereof down to the point 120 at which the press rolls contact will be entirely closed to form a compression chamber.

A briquette conveying endless belt 131 is positioned beneath the briquette press rolls and moves about rolls or pulleys 132 fixed to shafts 133 and 134 journaled on extended portions at the front and rear, respectively, of the upright members 16 and 17. Guide plates 135 are provided at the sides of the upper run of the belt 131 and at the front of the machine to prevent briquettes from falling from the belt.

A motor 136 mounted on the base 15 is used for driving the shafts of the briquetting apparatus, including the mixing and feeding chambers. The motor 136 includes a shaft 137 provided with a pulley and a belt 138 driven by the pulley transmits power from the motor to a relatively large pulley 139 fixed to a shaft 140 journaled in the upright members or side walls 16 and 17 of the briquetting press beneath the upper run of the conveyor belt 131. A safety clutch 141 may be provided on the shaft 140 to prevent damage to the motor. A relatively small pinion 142 is carried on the left-hand end (Figure 3) of the shaft 140 and meshes with a relatively large gear or pinion 143 fixed to a shaft 144 which is also journaled in the upright members 16 and 17 beneath the upper run of the conveyor belt 30. The shaft 144 carries a small pinion 145 between the adjacent upright member 16 and the gear 144, the pinion 145 meshing with the pinion 118 on the briquetting press roll shaft 117. Since pinion 118 meshes with the pinion 104 on the shaft 101 of the mixing chamber and as the latter pinion forms part of the gear train through which the shafts 83 and 90 are rotated the mixing, feeding and briquetting steps will all be conducted from a single source of power. The shaft 133 is driven from the shaft 144 by means of a sprocket chain or belt 146.

The preliminary treatment of the materials to be formed into briquettes may be briefly summarized as follows: The coal screenings fed to the coal treating hopper 24 by the conveyor 27 are there heated and treated to have the proper degree of moisture by means of steam. If the coal screenings are in a dry state when fed to the coal treating hopper, saturated steam will be injected into the mass from the headers 44 to moisten it and, in extreme cases, some hot water may be applied to the mass. If the screenings as fed to the hopper are too moist, superheated steam will be injected into the hopper to heat and dry the mass to a less moist state. In either event, the result of the treatment in the hopper 24 will be to place the coal screenings in the most satisfactory condition for proper amalgamation with the asphalt or other adhesive binder. If a small quantity of grain is to be included in the briquette mixture, it will be supplied from the hopper 26 to measuring conveyor 23 by binder measuring conveyor 25 and a measured mixture of ground grain and coal screenings will be fed into the upper end of extension 22 of the mixing chamber 21 by the conveyor 23.

From one to two per cent of ground grain may be included in the mixture if such a binder is to be used.

A liquid asphalt or other adhesive binder heated to the proper temperature will be supplied through the pipe line 77, the adhesive binder being mixed with steam prior to its entrance to the chamber 21 so that it will be in an emulsified condition for more ready mixture with the coal screenings. If necessary, additional superheated or saturated steam may be supplied to the mixture in the upper end of the mixing chamber 21 through the nozzles 81 to give it the desired degree of heat and moistness necessary for the efficient handling of the mass and so that it will not subsequently become too cool or dry for compression into briquettes.

The operation of the mixing and feeding apparatus in the mixing chambers 20 and 21 and feeding chamber 19, respectively, is as follows:

The ingredients supplied to the upper portion 21 of the mixing chamber 20 are thoroughly intermixed by the action of the mixing paddles 84 and 89 carried by the mixing shafts 83 and 90 and the grain in the mixture, if grain is used, becomes a starchy mass. The binder being in a highly heated state at the moment when it is introduced to the mixing chamber 21 will be in a fluid condition and will flow readily throughout the mass of coal. The rotation of the mixing shafts 83 and 90 will cause a continual and thorough mixing movement of the mass in the chamber 21 so that every particle of coal will have a thin film of binder applied thereto.

As the mass, due to its own weight, moves downwardly in the mixing chamber 20 and away from the steam supply, it will cool or be tempered so that the adhesive binder will have more tensile strength and will hold the particles together during the subsequent briquetting operation.

Since the spiral blades upon the shaft 101 in the feeding chamber 19 are disposed to feed in opposite directions, and to move material from each end of the chamber 19 to the center thereof, the mass in the chamber 20 will tend to move through the larger or transfer ports 99 and 100 at each end of the mixing chamber 20 and into the feeding chamber 19, any entrance of the mass through the smaller central port 98 being resisted by the action of the portions of the blades 102 and 103 opposite this port.

The mass moving into feeding chamber 19 at each end thereof will be further mixed and subjected to an intense kneading action by the blades 102 and 103 as it is moved toward the central portion of the chamber, the close proximity of the walls of the chamber to the periphery of the blades causing pressure to be applied to the mass to move it outwardly through the outlet port 105 leading to the briquetting rolls 115. A portion of the mass will be forced upwardly and back into the mixing chamber 20 through the reduced central or return port 98 in the lower wall of the mixing chamber. It will be noted that the return port is of insufficient size to permit any considerable portion of the mass to be moved back into the mixing chamber, and the presence of the mass in chamber 20 undergoing mixture will further resist movement of material upwardly through port 98 so that the pressure in chamber 19 is not relieved to any considerable degree through this port, resulting in a thorough kneading or mixing of the mass. Nevertheless, the return port 98 will enable any surplus quantity above the capacity of the briquetting rolls 115 to be by-passed so that the capacity of these rolls will not be exceeded. The portion of the mass fed back into the chamber 20 will be given a further mixing action by the paddles on the lower mixing shaft 90. Both the chambers 20 and 19 preferably will be kept filled with the mass being mixed and it will therefore result that material fed from the chamber 19 to the briquetting rolls will immediately be replaced by material from the mixing chamber 20 through the transfer ports 99 and 100 and the mass in both chambers will be in continual movement and under constant pressure.

By my process, the mass moving downwardly in the chambers 21, 20 and 19 will be tempered or cooled while undergoing mixing action so that the liquid binder (which is in a fluid state and has substantially no adhesive properties when fed into the chamber 21) may cool sufficiently to have the proper adhesive properties to hold the particles together when briquettes are formed from the mass. However, it sometimes occurs that the mass will become too cool during the mixing action and, in such instances, the mass in the feeding chamber 19 may be heated by steam from the nozzles 19' to bring the ingredients, and particularly the liquid binder, to a suitable temperature to have proper adhesive qualities to thus form a strong briquette.

The mass fed through the outlet port or aperture 105 to the briquetting rolls 115 will be formed into briquettes by these rolls in the usual manner, which briquettes will be piled in front of the machine by the conveyor belt 131.

It will be understood that the plant may be used for forming briquettes other than fuel briquettes and that the mixing and feeding apparatus is of wide application.

Figures 9 and 10 illustrate a modified form of mixing and feeding or extruding apparatus which may be used with the present machine, or for general purposes. This structure comprises a mixing chamber 150 having side walls 151 and front and rear walls 152 and 153, respectively. The lower wall 154 of the chamber 150 is preferably arcuate and includes a port or aperture 155 communicating with a lower feeding or extruding chamber 156, having vertical end walls 157 and semi-circular front and rear walls 158. An outlet port 159 is provided in the lower portion of the chamber 156 through which material is fed or extruded.

A horizontal mixing shaft 160 is provided in the mixing chamber 150, the ends of the shaft being journaled in the end walls of the chamber and the shaft being provided at one end, and on the exterior of the chamber, with a driving gear 161 operated from any suitable source. The shaft 160 is preferably squared throughout the portion of its length within the mixing chamber 150 and is fitted with a number of right and left-hand mixing paddles 162 similar in construction to the paddles 84 and 89 used in the form of my invention illustrated in Figures 1 to 8, inclusive, and including blades 163 and hubs 164. As is best shown in Figure 9, the blades 163 of the adjacent paddles are turned with respect to each other to form alternate right and left-hand mixing blades. An even number of blades is preferably used upon the shaft 164 and the end paddles upon the shaft are so arranged that when the shaft is rotated, they will remove material from the end walls 151 and will direct such material toward the next adjacent paddles. The paddles are so arranged circumferentially of the shaft that adjacent paddles will project from the shaft in different radial directions. In the preferred form of the invention, adjacent paddles project at angles 90° apart in a circumferential series.

The mass in the chamber 150 will be forced downwardly toward the arcuate bottom walls 154 by the paddles 162 and because of its own weight. The port or aperture 155 at the bottom of the mixing chamber is not of uniform size throughout its length, but includes enlarged portions 166 at each end thereof and a reduced portion 167 at the central portion thereof and opposite the outlet port 159. The feeding or extrusion chamber 156 is provided with a horizontal shaft 168 in vertical alignment with the shaft 160 in the mixing chamber, shaft 168 being journaled in the end walls 157 of the feeding chamber. A gear 169 is provided on the end of the shaft 168 exteriorly of the chamber 156, which gear meshes with and is driven by a gear 170 on the mixing shaft. Where a single mixing shaft is used the gear ratio is such that the feeding shaft 168 will rotate more slowly than the mixing shaft. Shaft 168 is preferably squared and carries two spirally bladed feed screws 171 and 172, one left-handed and the other right-handed, and the two together serving to force the material received in the feeding chamber toward the center of the feeding chamber when rotated.

Figure 11:
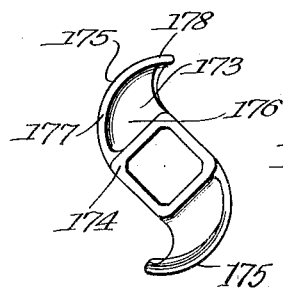
Figure 11 is a side elevation of a densifying paddle which may be used with my mixing apparatus.

In some instances, a densifying paddle 173 may be provided upon the feeding shaft 168, which densifying paddle is positioned in alignment with the central portion of the outlet aperture 159 and the reduced portion 167 of the aperture or port 155 between the mixing chamber 150 and the feeding chamber 156. As is best shown in Figure 11, the densifying paddle 173 includes a hub portion 174 provided with oppositely extending blades 175 having the form of a flat helix with flattened leading surfaces. A rib 176 integral with the hubs and blades reinforces the latter. The side edges 177 of the blades 175 diverge from each other from the hub 174 toward the outer and rear edges 178 of the blades, as best shown in Fig. 9.

The operation of the apparatus of Figs. 9 and 10 is as follows:

The ingredients supplied to the mixing chamber 150 will be thoroughly intermixed by the action of the mixing paddles 162 and will be moved downwardly in the mixing chamber 150 toward the port 155 by the paddles and due to its own weight. Since the spiral blades 171 and 172 are disposed to move material in opposite directions and toward each other, the mass in the mixing chamber 150 will tend to move into the feeding chamber 156 through the enlarged end portions 166 of the aperture 155, any entrance of the mass through the reduced portion 167 of the aperture 155 being resisted by the outward feeding action of the portions of the screw blades 171 and 172 opposite this portion of the aperture. The mass moving into the feeding chamber 156 at each end thereof will be further mixed and kneaded by the blades 171 and 172 as it is moved toward the central portion of the chamber 156, the close proximity of the walls of the chamber to the peripheries of the blades causing pressure to be applied to the mass to move it outwardly through the lower or outlet port 159. If the feeding of the mass by the spiral blades 171 and 172 in the feeding chamber 156 is so rapid that a quantity above the capacity of the aperture 159 is presented thereto, the surplus above the capacity of this aperture will be fed upwardly through the reduced portion 167 of the port or aperture 155 and thence back into the mixing chamber 150. The return of material through the reduced port 167 will be resisted by the presence of the material in the mixing chamber 150 so that the extruding action of the blades 171 and 172 with respect to the outlet port 159 will not be too materially lessened. The course of travel of the materials is indicated by the curved arrows of Figure 9.

When the material to be mixed by the apparatus is of relatively low specific gravity, the densifying paddle 173 may be used upon the shaft 168 as shown in Figure 9. The construction of this paddle is such that during rotation it will tend to densify material and force it through the outlet port 159 under pressure. Any surplus material above the capacity of the outlet port 159 will be moved upwardly through the reduced portion 167 of the aperture 155 in the manner described above.

It will be obvious that the mixing and feeding device of the structure shown in Figures 9 and 10 may be used in my briquetting plant and the apparatus disclosed in Figures 1 to 8, inclusive, instead of the mixing and feeding apparatus shown therein. In case the material to be formed into briquettes by the apparatus of Figures 1 to 8 is of low specific gravity, the densifying paddle 173 shown in Figures 9 and 11 may be included in the feeding chamber 19 of that apparatus.

It will be understood that the invention is not limited to the details of construction shown in the drawings and described in the specification and that the examples of the use of the various forms of the apparatus and method which have been given do not include all of the uses of which the apparatus is capable or by which the method may be followed; also, that the phraseology employed in the specification is for the purpose of description and not of limitation.

I claim:

1. A briquette forming apparatus comprising a mixing chamber, an extrusion chamber, a compression chamber in which briquettes are formed, the mixing chamber and the extrusion chamber having a communicating port therebetween, which port is restricted at one portion thereof, the extrusion chamber and the compression chamber having a communicating port therebetween positioned opposite the restricted portion of the first-named port, mixing means in the mixing chamber, extrusion means in the extrusion chamber, the mixing means and extrusion means arranged to cooperate to cause material to move from the mixing chamber to the extrusion chamber through the unrestricted portion of the first-named port and to cause a predetermined quantity of material to be forced through the second-named port into the compression chamber and to cause any surplus material above the capacity of the last-named port to be returned through the restricted portion of the first-named port, and compression means in the compression chamber.

2. A briquette forming apparatus comprising a mixing chamber, an extrusion chamber, a compression chamber in which briquettes are formed, the mixing chamber and the extrusion chamber having a communicating port therebetween, which port is restricted at its central portion, the extrusion chamber and the compression chamber having a communicating port therebetween opposite the central restricted portion of the first-named port, mixing means in the mixing chamber, extrusion means in the extrusion chamber, the mixing means and extrusion means arranged to cooperate to cause material to move from the mixing chamber to the extrusion chamber through the unrestricted portion of the first-named port and to cause a predetermined quantity of material to be forced through the second-named port in the compression chamber and to cause any surplus material above the capacity of the last-named port to be returned through the restricted central portion of the first-named port, and compression means in the compression chamber.

3. A briquette forming apparatus comprising a mixing chamber, an extrusion chamber, a compression chamber in which briquettes are formed, the mixing chamber and extrusion chamber communicating through transfer ports at the end thereof and through a central return port, the extrusion chamber and the compression chamber communicating through an outlet port opposite the return port, means to regulate the size of the outlet port, a rotary shaft in the mixing chamber having a plurality of mixing blades thereon, alternate blades being adapted to move material in opposite directions, a rotary shaft in the extrusion chamber having oppositely facing spirals thereon to direct material toward the outlet and return ports, the blades and spirals on the respective shafts being arranged to cooperate to cause material to move from the mixing chamber to the extrusion chamber through the transfer ports and to cause material to be forced through the outlet port into the compression chamber and to cause any surplus material above the capacity of the outlet port to be returned through the return port, and compression means in the compression chamber.

4. A briquette forming apparatus comprising a mixing chamber, an extrusion chamber, the chambers communicating through spaced transfer ports and a central return port and the extrusion chamber having an outlet port aligned with the return port, means to regulate the size of said outlet port, briquette forming means aligned with the outlet port, a shaft extending longitudinally of the mixing chamber, oppositely facing blades on the shaft, a shaft in the extrusion chamber, oppositely facing spiral members on the last-named shaft to direct material toward the outlet port and return port, means to rotate the shafts and to operate the briquette forming means, rotary movement of the blades in the mixing chamber causing the material to be mixed and the movement of the blades and the spiral members causing material to move from the mixing chamber to the extrusion chamber through the transfer ports and a predetermined quantity of material to be forced through the outlet port to the briquette forming means, surplus material above the capacity of the outlet port being returned through the return port.

5. A briquette forming apparatus comprising a mixing chamber, an extrusion chamber, a compression chamber in which briquettes are formed, the mixing chamber and the extrusion chamber having a communicating port therebetween, including enlarged end portions and a smaller central portion, the extrusion chamber and the compression chamber having a communicating port therebetween, mixing means in the mixing chamber, extrusion means in the extrusion chamber, said means being in parallel relation, the mixing means including blades facing toward each end thereof and the extrusion means including a helical blade, said blades being so positioned with respect to each other and said ports that material will be moved from the mixing chamber to the extrusion chamber through the enlarged portions of the first-named port and a predetermined quantity of material will be forced through the second-named port into the compression chamber and any surplus material above the capacity of the last-named port will be returned through the central portion of the first-named port, and compression means in the compression chamber.

6. The combination with an apparatus for forming fuel briquettes including a hopper for coal, a hopper for starch binder, and a mixing chamber, of means to deliver measured quantities of coal and starch binder in a continuous stream to the mixing chamber comprising an endless conveyor beneath the coal hopper and including a portion extending beyond a wall of the coal hopper, an endless conveyor beneath the starch binder hopper, and means on the respective hoppers to control the amount of material removed therefrom by the respective conveyors, the conveyor beneath the starch binder hopper being arranged to overlie the projecting portion of the coal hopper endless conveyor to deposit starch binder upon the coal hopper conveyor in advance of its movement beneath the coal hopper, the coal hopper conveyor depositing the mixture in the mixing chamber.

7. Apparatus for forming fuel briquettes from coal, a starch binder and a liquid binder comprising a coal hopper, a mixing chamber, means to feed sized coal to the hopper, means to heat the coal in the hopper, means to deliver a measured quantity of coal from the hopper to the mixing chamber, a starch binder hopper, means to deliver a measured quantity of starch binder from the starch binder hopper to the last-named delivering means, means to feed a measured quantity of liquid binder to the mixing chamber, means to deliver a heating fluid to the inlet portion of the mixing chamber, an extrusion chamber, mixing means in the mixing chamber to move the mixed mass to the extrusion chamber, a briquetting press, and means to move material from the extrusion chamber to the briquetting press, the mixed mass being cooled to briquetting temperature during its movement through the mixing chamber and extrusion chamber.

GUSTAV KOMAREK.